INVENTOR.
BERNARDUS J. STARING
BY Arne T. Fors
Agent

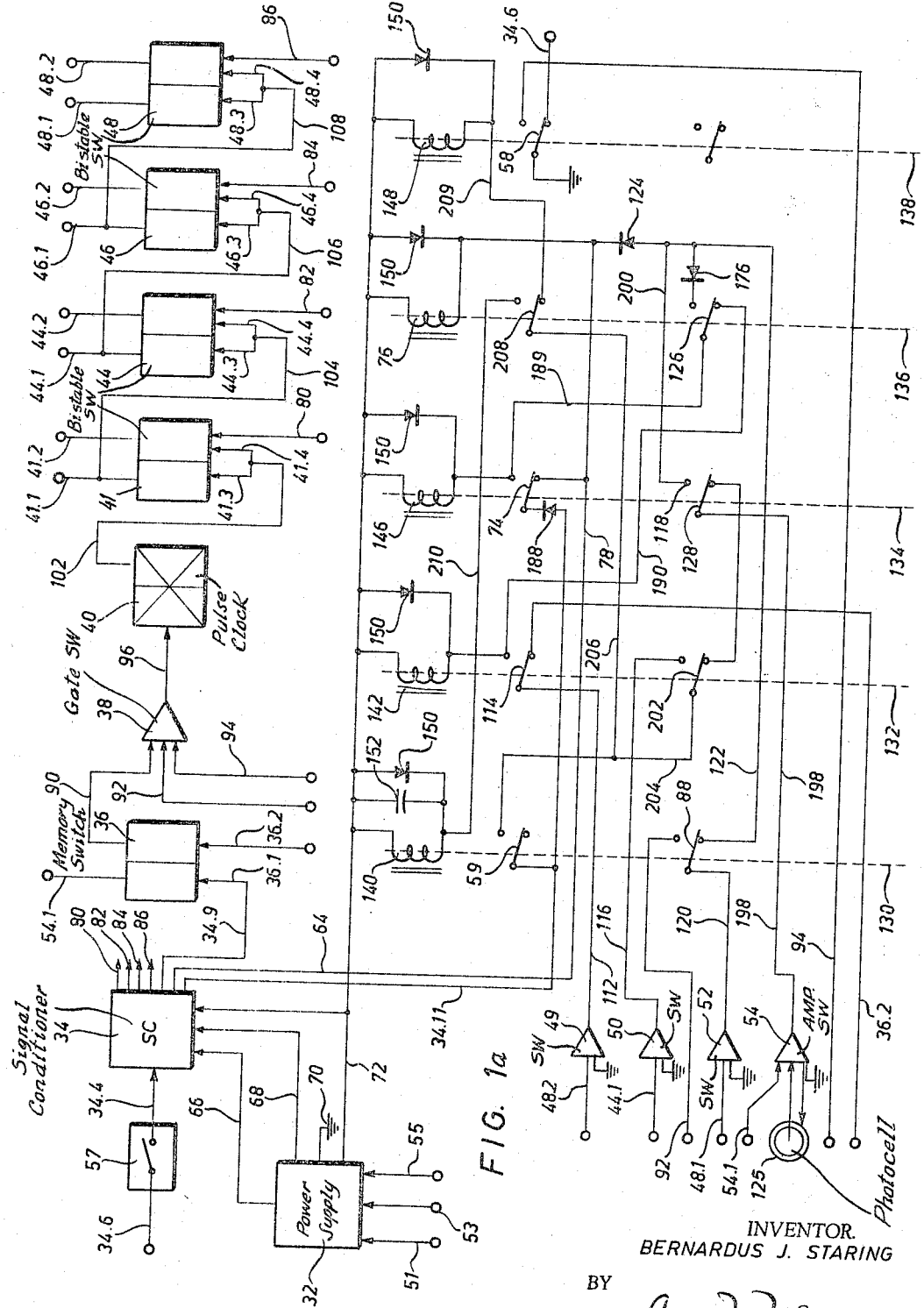

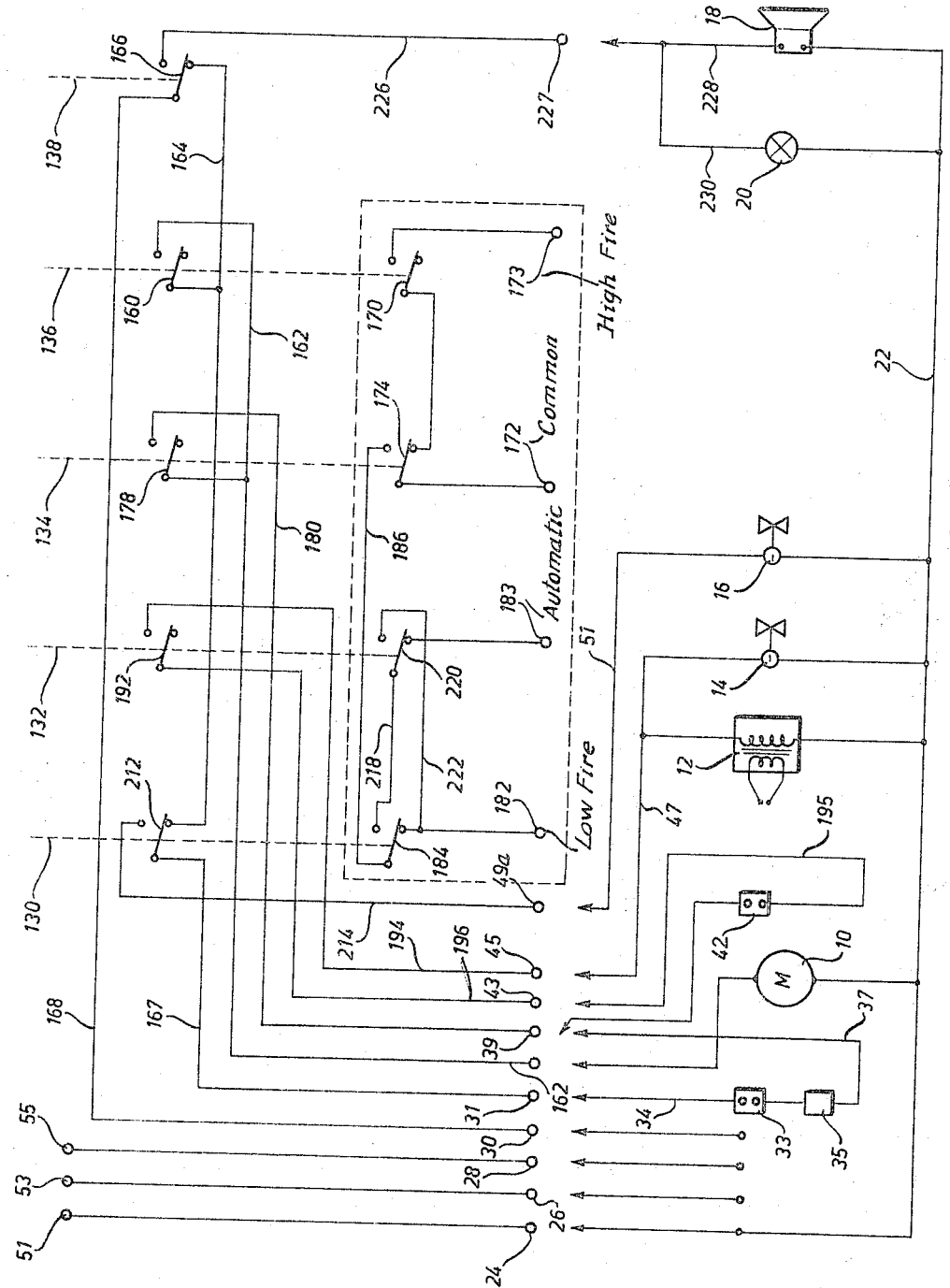

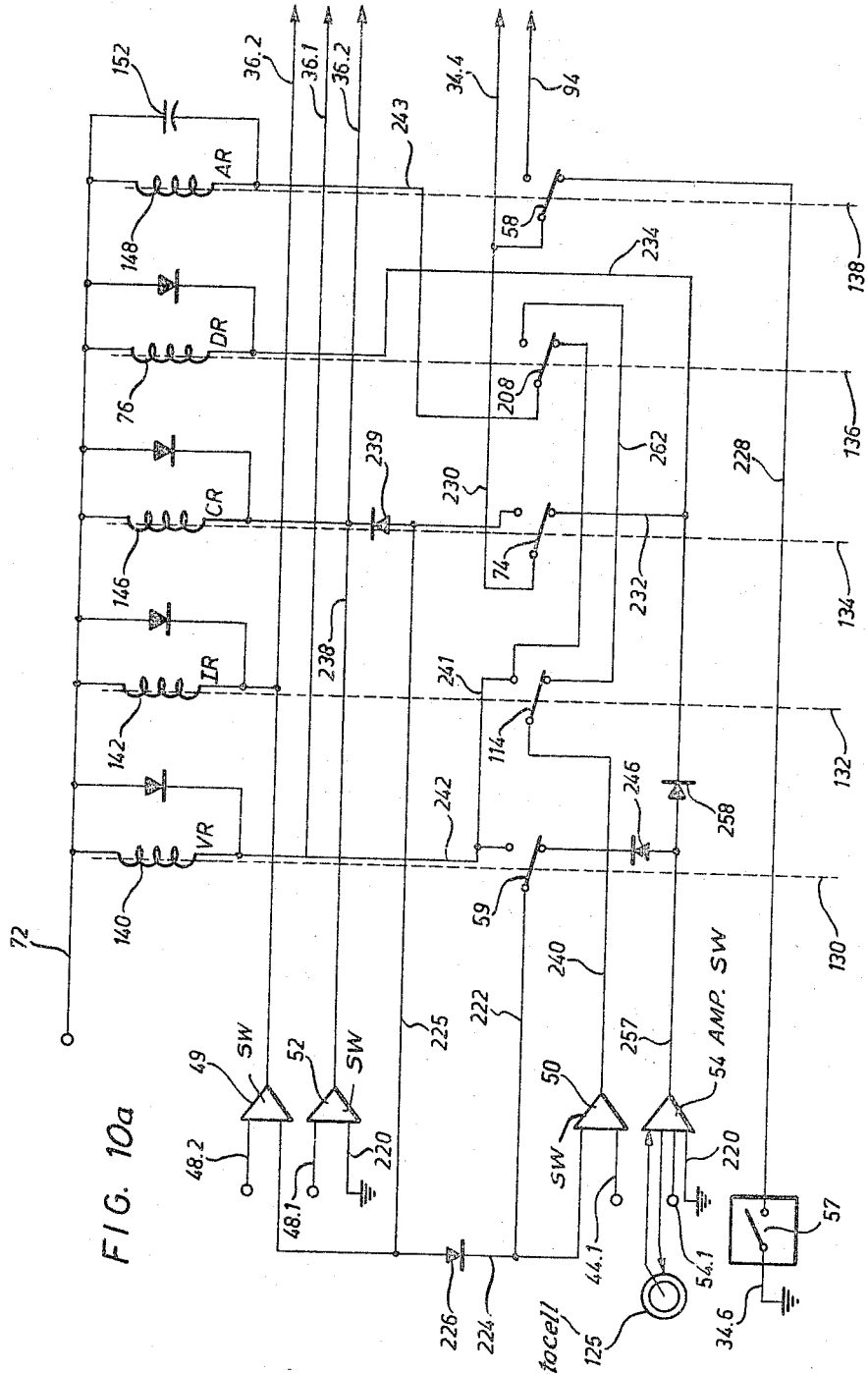

United States Patent Office 3,324,927
Patented June 13, 1967

3,324,927
BURNER CONTROL SYSTEM
Bernardus J. Staring, Markham, Ontario, Canada, assignor to Sarco Canada Limited, Agincourt, Ontario, Canada, a company of Canada
Filed Feb. 4, 1965, Ser. No. 430,345
10 Claims. (Cl. 158—124)

This invention relates to an improved fuel burner control system and is particularly directed to an automatic fuel burner control system of an improved electronic type.

Conventional burner control systems controlled and actuated by electro-mechanical timing devices suffer from a major disadvantage in that they cannot provide a continuous component check during standby and a progressive component check throughout the operating cycle to provide an instantaneous installation shut-down upon failure of a component. Consequently, unsafe operating conditions can remain undetected and unchecked resulting in serious damage to equipment and injury to personnel. Also, such systems are restricted in practical use to an operating cycle of short duration. This is an important disadvantage in that the pre-purge and post-purge periods are of necessity of short duration thereby allowing, in some cases, the collection of explosive mixtures of partially combusted gases in the furnace combustion chamber.

Conventional burner control systems normally cannot be interrupted in mid-cycle and immediately reset to their starting points but must continue throughout the balance of the operating cycle before recommencing the cycle. This undesirable feature can lead to unsafe and hazardous operating conditions where a malfunction in the system results in liquid and/or gaseous fuels accumulating in the furnace combustion chamber and this accumulation of fuels subsequently ignited when the operating cycle is re-initiated. Conventional systems suffer from a further disadvantage in that it is possible that compensating and accumulating malfunctions can occur within the control or output stages thereby permitting the continuation of the start-up and operating cycle when unsafe conditions prevail. Furthermore, conventional fuel burner control systems normally rely on the use of bimetallic safety switch means for de-energizing the fuel burner in the event the fuel fails to be ignited within a predetermined time. The operation of such switches is dependent on the ambient temperature and temperature variations due to external causes can therefore affect the reliability of these systems.

I have found that the system of the present invention substantially obviates the above noted disadvantages, among others, inherent in conventional burner control systems heretofore available. The present invention is directed to an improved fuel burner control system having a solid state power supply which provides a stable and regulated voltage for the integrated computer circuits of an electronic programmer which controls the time sequence and function of the system while monitoring the safety checks for the operation of the equipment supervised. The relay output stage of the system is integrated with the burner system and electronic programmer to provide a double-check of the internal and external circuitry.

It is, therefore, an important object of the present invention to provide an electronic fuel burner control system which automatically provides a continuous component check throughout the standby period and a progressive check during the start-up and operating cycle which results in immediate fail-safe conditions upon the failure of any component within the control system.

It is another important object of the present invention to provide an electronic control system which can be extended indefinitely to provide an operating cycle of any desired duration.

It is another important object of the present invention to provide a control system which immediately resets to its start position after the interruption of the cycle due to external causes such as momentary power failures and the like.

Another object of the present invention is the provision of a substantially trouble-free and reliable control system which is self-supervisory and provides a cross-check on the internal and external circuitry and components to avoid the occurrence of compensating or accumulating malfunctions.

And another object of the invention is the provision of a control system having components which are interchangeable and hermetically sealed thereby minimizing the complexity and frequency of field maintenance.

And still another object of the present invention is the provision of a control system having a solid state power supply which instantaneously provides stable operating conditions.

These and other objects of the present invention and the manner in which they can be attained will become apparent from the following detailed description of the drawings, in which:

FIGURE 1a is a schematic illustration of the control portion of the system of the present invention showing the general circuitry and arrangement of component parts;

FIGURE 1b is a schematic illustration of the controlled portion of the system of the present invention energized by line voltage;

FIGURE 2 is a schematic illustration, in detail, of the circuitry of the signal conditioner of the invention shown generally in FIGURE 1a;

FIGURE 3 is a schematic illustration, in detail, of the circuitry of the bistable units employed in the present invention shown generally in FIGURE 1a;

FIGURE 4 is a schematic illustration, in detail, of the gate circuitry shown generally in FIGURE 1a;

FIGURE 5 is a schematic illustration, in detail, of the circuitry of the clock pulse generator shown generally in FIGURE 1a;

FIGURE 7 is a schematic illustration of the circuitry of the transistor switches employed in the present invention also shown generally in FIGURE 1a;

FIGURE 8 is a schematic illustration of the circuitry of the amplifier switch employed in the present invention shown generally in FIGURE 1a;

FIGURES 10a and 10b are schematic illustrations of another embodiment of the system of the present invention.

Like reference characters refer to like parts throughout the detailed description of the drawings.

Figure 2:
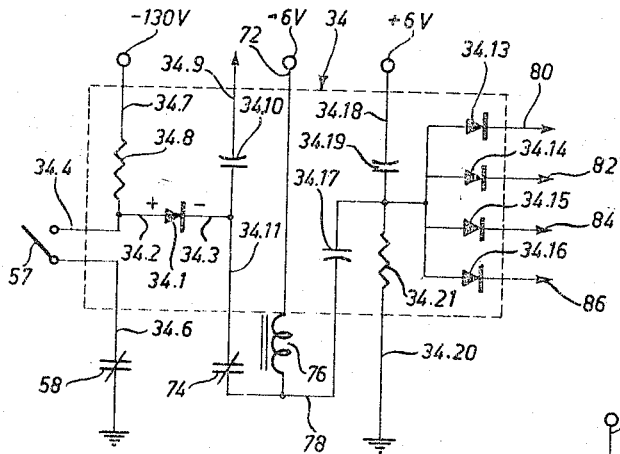

With reference to the drawings, the elements external to and controlled by the system of the present invention are a burner motor 10, ignition transformer 12, pilot valve and solenoid 14, main fuel valve and solenoid 16, alarm horn 18 and alarm light 20. Each of these elements has one lead connected to a common conductor 22 which communicates said elements via power terminal 24 to the external power supply. For purposes of illustration, terminal 24 represents the line neutral. The opposite leads of said elements are connected to selectively actuated relay switches, as will be described hereinbelow as the description proceeds, and thence to external power supply via terminal 26, 110 volts A.C. or terminals 28, 230 volts A.C. and terminal 30, 110/230 volts A.C.

With particular reference to the schematic illustration of FIGURE 1a, the general electrical circuitry of the present invention comprises a power supply unit 32, a signal conditioner 34 which is normally operative to emit an electrical pulse hereinafter referred to as a reset pulse and an operating signal, bistable memory unit 36, gate 38, clock pulse generator 40 which is normally operative to generate electrical pulses of a predetermined shape and frequency hereinafter referred to as clock pulses, cascading bistable units 41, 44, 46 and 48 adapted to receive said clock pulses, transistor switches 49, 50 and 52 and amplifier switch 54.

The power supply unit 32 is a standard low-voltage D.C. power supply unit consisting of transistors and solid state diodes well known in the art for conversion of A.C. voltage to low potential D.C. voltage and provision of a stable D.C. voltage output regulated to compensate for variable load requirements. Power supply unit 32 is conected to the line terminals 24, 26 and 28 by leads 51, 53 and 55 respectively and has a +6 volts D.C. output lead 66, −130 volts D.C. output lead 68, control circuit ground lead 70, and −6 volts D.C. lead 72. It will be understood that the term "ground" lead, as used hereinbelow, will relate to the control circuit ground.

With particular reference now directed to FIGURE 2, the circuitry of signal conditioner 34 includes a semiconductor diode 34.1 having an anode lead 34.2 and a cathode lead 34.3. Anode lead 34.2 is connected to lead 34.4 communicating with the operating control off-on switch 57 which is connected to ground by lead 34.6 having the normally-closed contacts of relay-actuated switch 58 in series. The −130 volt supply lead 34.7 having resistor 34.8 in series therewith is connected to normally-open switch 57. Cathode lead 34.3 of diode 34.1 is connected to lead 34.9 having a capacitor 34.10 in series communicating with lead 36.1 of memory unit 36. Cathode lead 34.3 is also connected with −6 volt supply lead 72 by lead 34.11 having the normally-closed contacts of relay-actuated switch 74 and solenoid winding 76 in series. Lead 78 connects switch 74 and the cathode lead 34.3 of diode 34.1 with the anode sides of semi-conductor diodes 34.13, 34.14, 34.15 and 34.16. A capacitor 34.17 is connected in series with lead 78 and a lead 34.18 connected to lead 78 intermediate capacitor 34.17 and diodes 34.13 through 34.16 having a capacitor 34.19 in series connects said lead 34.18 with +6 volt lead 66. A lead 34.20 having a resistor 34.21 in series communicates the anode sides of diodes 34.13, 34.14, 34.15 and 34.16 to ground.

The application of power to the system via lead 51, 53 and 55 causes a positive reset pulse to flow from capacitor 34.19 to the anode side of diodes 34.13, 34.14, 34.15 and 34.16 through said anodes to leads 80, 82, 84 and 86 of bistable units 41, 44, 46 and 48.

It will be evident that the closing of switch 57 will allow the potential of −130 volts to drive a current through lead 34.7, resistor 34.8, lead 34.4, across the switch contacts 57 and through lead 34.6 and the normally-closed contact of switch 58 to ground, thus providing a reliable switching potential for the contacts of switch 57 and allowing the potential of −6 volts from lead 72 to flow current through solenoid winding 76 and across the normally-closed contact of switch 74, through lead 34.11, cathode lead 34.3 and diode 34.1, anode lead 34.2, aforesaid lead 34.4, across switch 57, lead 34.6 and switch 58 to ground. Thus, solenoid 76 is energized and a potential of −6 volts is taken off capacitor 34.10 causing a positive going voltage step to be transmitted to lead 36.1 of memory unit 36 via lead 34.9.

Figure 3:
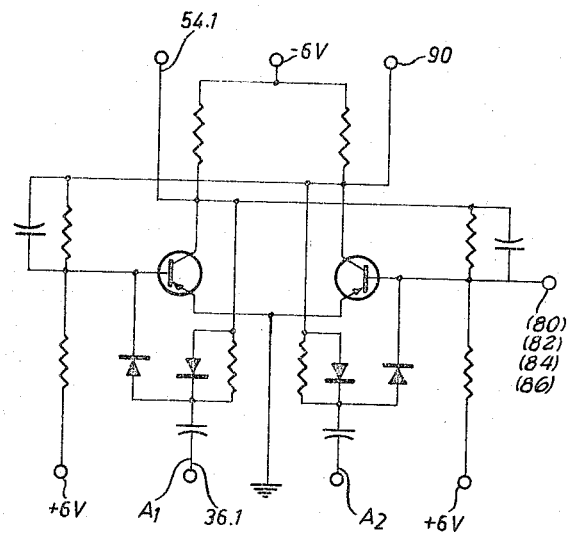
Figure 4:
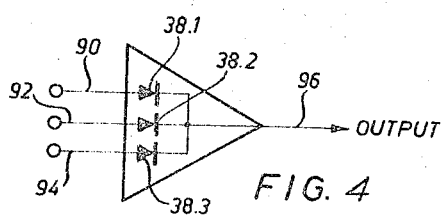

Memory unit 36, illustrated in detail in FIGURE 3, comprises a standard "flip-flop" or bistable transistorized multivibrator circuit of a conventional type. The circuit constitutees a memory function when driven by means of a D.C. level or a positive-going voltage step. In the present invention, a positive-going voltage step of −6 to 0 volt via leads 34.9 and 36.1 changes the output from zero to a negative voltage level of memory unit 36 which is the input to diode 38.1 of "and" gate 38 via lead 90. Gate 38, illustrated in FIGURE 4, comprises three semiconductor diodes 38.1, 38.2 and 38.3 having anode leads 90, 92 and 94 and a common cathode lead 96. Anode leads 92 and 94 are connected to the normally-open contacts of relay-actuated switches 88 and 58. It will be evident that any positive or ground level signal on inputs 90, 92 or 94 will be transmitted to the output 96. Thus, all three of said inputs should have a negative input signal or be electrically disconnected in order to remove the positive or ground level from output lead 96 for reasons which will be given hereinbelow.

Figure 5:
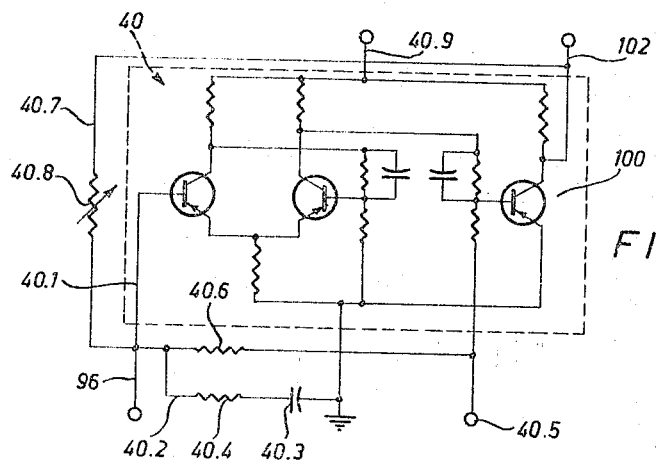

Gate 38 emits a continuous ground signal to clock pulse generator 40 when any of its inputs 90, 92 or 94 are kept at a ground level. When all input signals on gate 38 are removed or are negative, the input of generator 40 is no longer kept at ground level, permitting the operation of said generator. Generator 40, illustrated in FIGURE 5, comprises a transistorized squaring amplifier followed by an inverter circuit, as outlined by the broken lines designated by numeral 100, of a conventional type. A D.C. input signal of a magnitude exceeding the input tripping level of the unit, is re-shaped and inverted into the standard D.C. level at the output. Lead 96 from gate 38 connects with input lead 40.1 of pulse generator 40. A second lead 40.2, having a condenser 40.3 and resistor 40.4 in series, connects the junction of leads 96 and 40.1 with the ground and a third lead 40.5, having a resistor 40.6 in series, connects said junction of leads 96 and 40.1 with the +6 volts supply. Lead 40.7 connecting lead 96 and output lead 102 has a potentiometer 40.8 in series. A lead 40.9 connects the generator with the −6 volt supply.

The operation of unit 100 is well known, as described briefly hereinabove. The frequency of pulses emitted via output lead 102 is controlled by tuning potentiometer 40.8 relative to capacitor 40.3 which determines the RC time constant of the input circuit of the squaring amplifier. A desired frequency can thus be obtained by the selection of the resistance of potentionmeter 40.8 and capacitance of capacitor 40.3. When input 96 is isolated from the inputs of gate 38, as described hereinabove, the ground signal is removed from the junction of leads 96 and 40.2 which allows capacitor 40.3 to become charged, thus initiating the action of the pulse generator. When the voltage level at the junction of leads 96 and 40.2 reaches the triggering level of the squaring amplifier, the amplifier, due to the charge on capacitor 40.3, switches, thus activating the inverter amplifier and resulting in the output voltage level on lead 102 being inverted. Thus, capacitor 40.3 is discharged via lead 40.2 through potentiometer 40.8 and lead 40.7 to output 102. The input voltage level on lead 40.1 therefore changes beyond the triggering level thus switching squaring amplifier back to its original state. This again causes the inverter amplifier to invert the output voltage level of lead 102 to the original state for repetition of the sequence.

The signals emitted by pulse generator 40 are fed to bistable units 41, 44, 46 and 48 which are arranged in series to function as a normal binary counter producing output signals at terminals 41.1 and 41.2, 44.1 and 44.2, 46.1 and 46.2 and 48.1 and 48.2. Units 41, 44, 46 and 48 are identical in circuitry to memory unit 36 described hereinabove with reference to FIGURE 3. Lead 102 from pulse generator 40 is divided into a pair of leads 41.3 and 41.4 which are connected to the A.C. inputs A1 and A2. Lead 41.1 communicates one output of the unit 41 to lead 104 which is divided into two leads 44.3 and 44.4 which in turn are connected to A.C. inputs A1 and A2 of unit 44. In like manner, one output of unit 44, lead 44.1, is connected to the inputs of unit 46 by lead 106 and the one output of unit 46, lead 46.1, is connected to the inputs of unit 48 by lead 108.

Figure 6:
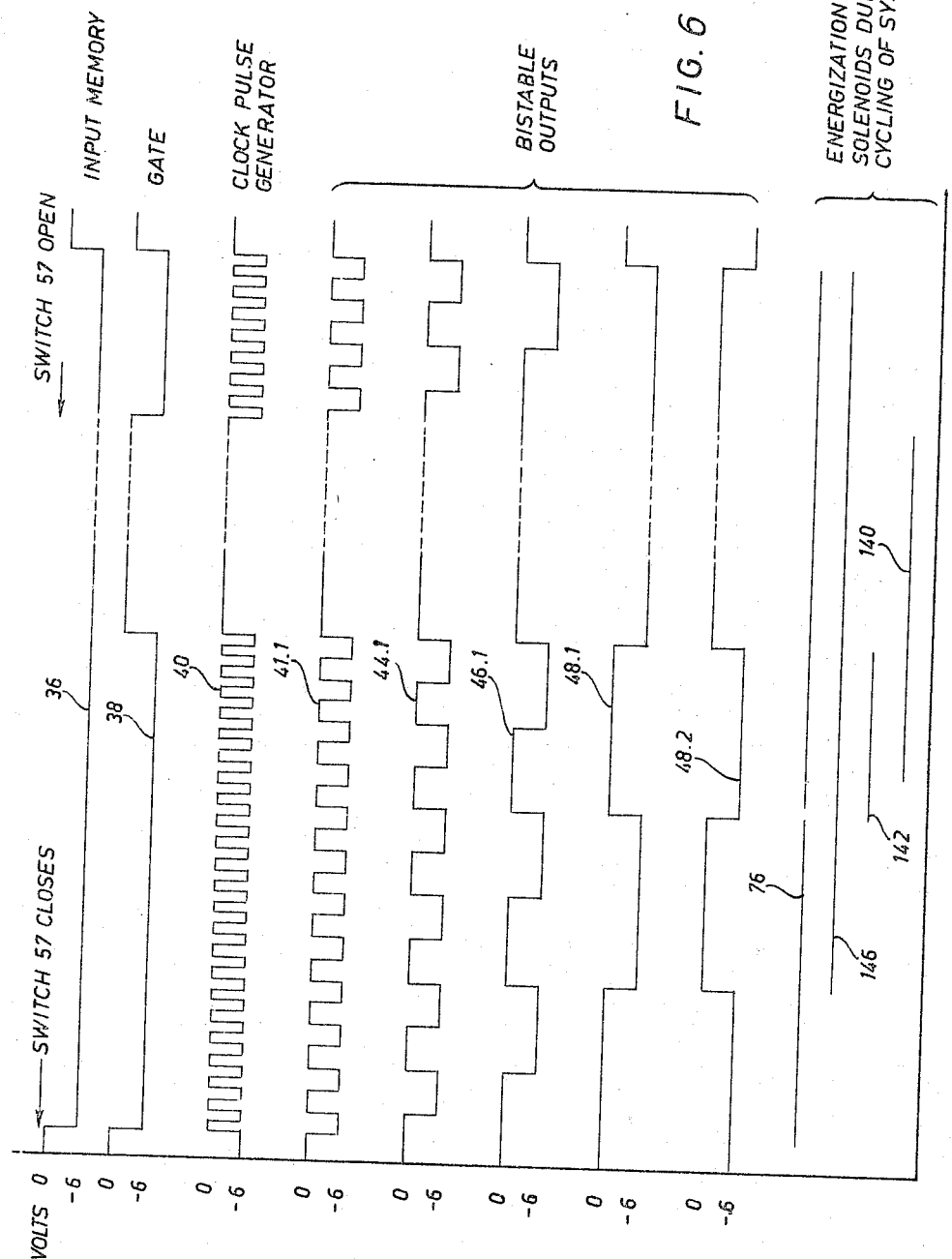
FIGURE 6 is a graphical illustration of the relative output frequencies of the bistable units shown in detail in FIGURE 3 and of the energization of the solenoid-actuated relays of the system in a typical cycle of operation.

The pulses emitted by pulse generator 40 are fed via input leads 41.3 and 41.4 into bistable unit 41 wherein the change of state of outputs 41.1 and 41.2 is effected by the positive-going edge of a negative pulse, output 41.1 changing from 0 to —6 volts and output 41.2 changing from —6 to 0 volts. Output 41.1 in switching to a negative level produces a negative-going edge and, since a positive-going edge is required to change the state of bistable unit 44, no change of state or switching of unit 44 takes place, the output voltage of leads 44.1 and 44.2 remaining constant. The second pulse from pulse generator 40 again changes the state of outputs 41.1 and 41.2 whereby output 41.1 changes from —6 to 0 volts and output 41.2 changes from 0 to —6 volts. Thus output 41.1 emits a positive-going edge which is transmitted to bistable unit 44 via lead 104 and input leads 44.3 and 44.4 effecting a change of state of outputs 44.1 and 44.2 from 0 to —6 volts and —6 to 0 volts respectively. The second positive-going pulse from output 41.1 will change the state of outputs 44.1 and 44.2 from —6 to 0 volts and 0 to —6 volts respectively. It will be evident from the foregoing that output 41.1 of bistable unit 41 will emit a positive-going pulse for every two pulses received from pulse generator 40 and in like manner, output lead 44.1 of bistable unit 44 will emit a positive-going pulse for every two positive-going pulses of unit 41. Thus, the frequency of pulsation across cascading bistable units 41, 44, 46 and 48 will be halved at each unit and if pulse generator emits X pulses per second, 41 will produce ½ x X pulses, unit 44 will produce ¼ x X pulses, unit 46 will produce ⅛ x X pulses and unit 48 will produce ¹⁄₁₆ x X pulses. FIGURE 6 illustrates the relative frequencies of pulsation of the various units together with a graphical presentation of the actuation of the several solenoids of the system as will be described in some detail hereinbelow with reference to the operation of the system.

Figure 7:
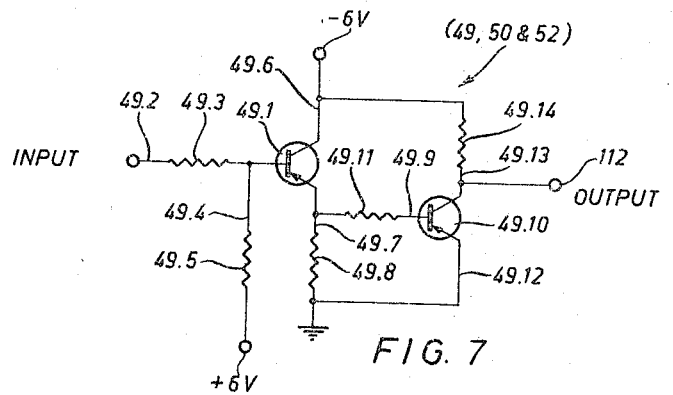

The output signals from units 44 and 48 are fed, via leads 44.1, 48.1 and 48.2 to transistor switches 50, 52 and 49 respectively. Switch 49, the circuitry of which is illustrated in detail in FIGURE 7, is identical to switches 50 and 52 and comprises a first transistor 49.1, having input lead 49.2 with resistor 49.3 in series connected to the base. A lead 49.4, having resistor 49.5 in series, communicates the base of transistor 49.1 with the +6 volt power supply. The collector lead 49.6 is connected to the —6 volt power supply and the emitter lead 49.7, having a resistor 49.8 in series, is connected to ground and to the base lead 49.9 of transistor 49.10 which has resistor 49.11 in series. The emitter lead 49.12 of transistor 49.10 is grounded and the follower lead 49.13, having output lead 112 connected thereto and resistor 49.14 in series, joins lead 49.6 to the —6 volt power supply.

Transistor 49.1 functions as an emitter follower and transistor 49.10 as an inverter amplifier such that a negative voltage level fed to input 49.2 causes signal emission from the emitter follower via lead 49.9 to saturate transistor 49.10 and allow current flow therethrough so as to in effect connect the controlled circuit to ground. In like manner, transistor switches 50 and 52 are energized by negative signals received from the bistable units described hereinabove to allow the flow of current therethrough.

The output lead 112 of switch 49 is connected to the normally-closed contact of relay-actuated switch 114 and communicates with input lead 36.2 of memory unit 36 upon the receipt of a pulse from unit 49.

The output lead 116 from transistor switch 50 connects with the normally-open contact of relay-actuated switch 202 and the output lead 120 from transistor switch 52 connects with the normally-closed contact of relay-actuated switch 88, lead 122 through diode 124 and solenoid winding 76 to —6 volt lead 72. The operation of the several relay-actuated switches and relay solenoids will become apparent as the description proceeds.

Figure 8:
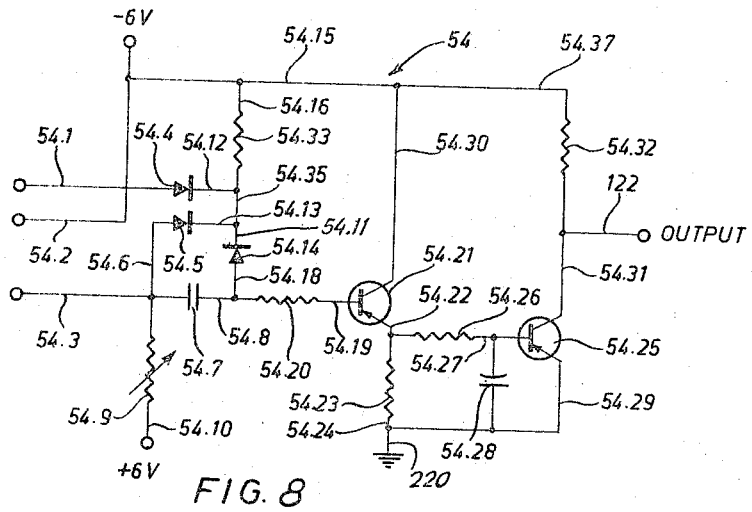

The amplifier switch 54, illustrated in detail in FIGURE 8, comprises a memory unit lead 54.1 and a pair of scanner inputs 54.2 and 54.3. Input 54.1 is connected to the anode side of semi-conductor diode 54.4 and input 54.3 is connected to the anode side of diode 54.5 via anode lead 54.6, input 54.3 also being connected, at the junction of leads 54.3 and 54.6, to capacitor 54.7 by lead 54.8 and to potentiometer 54.9 in series with lead 54.10 to the +6 volt power supply. Input lead 54.2 is connected directly to the —6 volt power supply. The cathode leads 54.12, 54.13 and 54.11 of aforementioned diodes 54.4 and 54.5 and diodes 54.14 are connected to the —6 volt power supply by leads 54.15 and 54.16 having resistor 54.33 in series. The anode side of diode 54.14 is connected by leads 54.18 and 54.8 to one side of capacitor 54.7 and to the base lead 54.19, having resistor 54.20 in series, of transistor 54.21. The transistor emitter lead 54.22 has a resistor 54.23 connected in series with lead 54.24 which is connected. A transistor 54.25 has a resistor 54.26 in series with lead 54.27 and a capacitor 54.28 across base lead 54.27 and grounded emitter lead 54.29. Collector leads 54.30 and 54.31 are inter-connected by lead 54.37 having a resistor 54.32 in series and an output lead 122 is connected to the junction of lead 54.37 and lead 54.31.

Amplifier switch 54 allows an A.C. voltage to be applied across capacitor 54.7 as the resistance of photoconductive cell 125 varies according to the fluctuating light intensity of a flickering flame within the combustion chamber. Cell 125 is a semi-conductor, light sensitive element which normally has a high resistance but becomes conductive when light energy of combustion impinges thereon or an ultra-violet detector device based on spark gap ignition whereby the impingement of ultra-violet radiation causes ionization of an inert gas permitting current flow therethrough. It will be evident that as the resistance of cell 125 drops current will flow from the +6 volt source via lead 54.10, potentiometer 54.9, lead 54.3 through cell 125 and return via lead 54.2 to the —6 volt terminal, thus a varying light of a normal flame will impress an alternating voltage across capacitor 54.7. An alternating signal travels from capacitor 54.7 to the base of transistor 54.21. The negative half cycle of such an A.C. signal will turn on this transistor thereby emitting a pulsating amplified current signal via emitter follower lead 54.22 to the base lead 54.27 of transistor 54.25 permitting the emission of an amplified D.C. signal from the collector via outlet 122. The function of capacitor 54.28 is to smoothen the output signal of the emitter follower 54.21 into amplifier transistor 54.25 in order to obtain a steady D.C. output signal. In the absence of a varying light the transmission of a D.C. signal of ground or positive potential via leads 54.1 and 54.3 and diodes 54.4 and 54.5 results in a ground or positive voltage on the cathode of diode 54.14, thus blocking negative D.C. signal on the base of transistor 54.21. But when both anodes of the diodes 54.4 and 54.5 are at a negative potential, the diodes will become biased in the reversed direction, thus allowing a negative signal to appear at the base of transistor 54.21 via lead 54.19, resistor 54.20, lead 54.18, diode 54.14, lead 54.35, resistor 54.33, lead 54.16 and lead 54.15 to the —6 volt power supply. Thus, transistor 54.21 will switch on and saturate transistor 54.25 via leads 54.15, 54.30, 54.22 and resistor 54.26 into base of transistor 54.25. It thus becomes evident that a D.C. signal in the absence of a flickering flame can be transmitted via this latter path when the input lead 54.1 of diode 54.4 is at a negative voltage level. A steady light source thus can be made to turn on switch 54 by impressing a negative potential on line 54.1.

Figure 9:
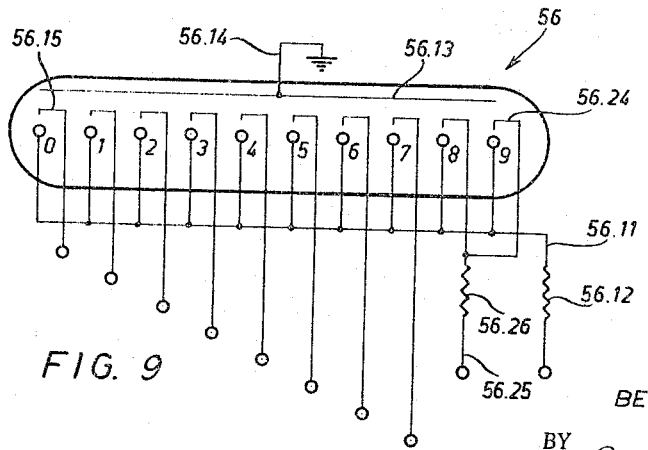
FIGURE 9 is the circuitry of an indicator tube which can be employed in the system of the present invention.

The indicator tube 56, illustrated in FIGURE 9, has a plurality of cathodes 0 through 9 having a common lead 56.11 with resistor 56.12 in series connected to the —130 volt power supply. A common plate 56.13 is grounded by lead 56.14 and the starter electrodes 56.15 through 56.24 corresponding to cathodes 0 through 9 respectively are connected as follows: electrode 56.15 to lead 90; electrode 56.16 to normally-closed switch 74; electrode 56.17 to normally-closed switch 88; electrode 56.18 to normally-closed switch 126; electrode 56.19 to normally-open switch 114; electrode 56.20 to lead 92; electrode 56.21 to common terminal 128; electrode 56.22 to lead 94; electrodes 56.23 and 56.24 to lead 56.25 of the —6 volt supply having resistor 56.26 in series.

Having described the electronic components and general circuitry of the present invention, the function of the system in start-up, operation, shut-down and stand-by will now be described. Generally, the operation of a complete burner cycle comprises a plurality of steps each of predetermined time intervals commencing with a preliminary purge, a pilot-proving sequence and ignition period, a continuous run period of indefinite duration, and a post-purge.

With particular reference to FIGURE 1a, it will be noted that the circuitry comprises a plurality of solenoid-actuated relay switches having armatures designated by numerals 130, 132, 134, 136 and 138 having solenoid windings 140, 142, 146, aforementioned winding 76 and winding 148, respectively, each solenoid connected at one side to —6 volt lead 72. Each winding has a diode 150 in parallel as illustrated, winding 140 also having a capacitor 152 in parallel therewith. The armature of each relay has a plurality of single-throw double-pole switches, the operation of which will become apparent as the description proceeds.

The application of power to power supply unit 32 via leads 51, 53 and 55 results in a reset pulse being emitted from signal conditioner 34 to bistable units 36, 41, 44, 46 and 48 via leads 34.9 and 80, 82, 84 and 86 automatically setting each unit in the start position. The closing of switch 57 results in a positive-going starting signal being given to the memory unit circuit 36 via the normally-closed alarm relay contact 58, lead 34.6 to the contacts of switch 57 and signal conditioner 34. The starting signal is thus interlocked with the proper starting relay position of switch 58.

The positive starting pulse will switch bistable memory unit 36 into its "on" condition, thereby opening gate 38 and releasing the clock pulse generator 40, provided the interlocking gate signals on inputs 92 and 94 of gate 38 are in the proper condition as has been described.

The pulse generator 40 will now start to produce pulses of the proper time-length and shape to operate the electronic timer described hereinabove consisting of the four bistable circuits 41, 44, 46 and 48. This timer circuit functions as a normal binary counter and produces the required output signals at the outputs 41.1, 41.2; 44.1 and 44.2; 46.1 and 46.2; and 48.1 and 48.2 of units 41, 44, 46 and 48 respectively. The closing of switch 57 also results in flame detector relay 76 becoming energized via signal conditioner 34, and the normally closed contacts 74 of control relay armature 134. The energization of solenoid 76 actuates relay armature 136 closing switch 160 thereby communicating one side of burner fan motor 10 with the 115/230 volts A.C. supply via lead 162, 164 and the normally-closed contact of alarm switch 166 to lead 168 having terminal 30. This action initiates the pre-purge period of the combustion chamber. At the same time, the burner modulating control 170, if used, is switched to its "high-fire" position via terminal 172, normally closed contact of switch 174 and the normally-open contacts of switch 170 now closed by the actuation of armature 136. The action of relay armature 136 is interlocked with the required deenergized position of relay armature 134 via the normally-closed contact of switch 74.

At the moment solenoid 76 becomes energized, the clock pulse generator is released and starts pulsing into the first bistable unit 41. Since the bistable units 41, 44, 46 and 48 will only change the state of their outputs at the positive-going edge of a negative pulse, it will be evident that a progressive "divide by two" circuit is obtained by cascading these binaries via their respective A.C. inputs and their interconnected outputs, as illustrated in FIGURE 6.

For the purpose of illustration, it will be assumed that the clock pulse generator operates at one-half cycle per second. The time interval between two positive-going pulse edges will therefore last two seconds and control signals will be emitted via bistable unit outputs 44.1 and 48.1 and 48.2 every 8 and 32 seconds respectively. It will be noted that timer outputs 44.1, 48.1 and 48.2 are connected to transistor switches 50, 52 and 49 respectively and that negative signals are required from the time outputs in order to activate these switches. Thirty-two seconds after start-up output 48.1 of bistable unit 48 will change from 0 to —6 volts, thus saturating transistor switch 52 allowing the flow of current therethrough to energize relay winding 146 via lead 120, the normally-closed contact of switch 88, lead 122, diode 176, the normally-open contact of relay-actuated switch 126 and lead 189 to —6 volt lead 72. The energization of relay winding 146 is dependent on the prior actuation of armature 136 by solenoid winding 76 to close the normally-open contact of switch 126 and the closing of normally-open contact of switch 178 by armature 134 places lead 180 in parallel with lead 164 providing an alternative circuit for fan motor 10. Concurrent with the closing of switch 178, armature 134 closes the normally-open contact of switch 174 thereby closing the modulator circuit from "low fire" terminal 182 to common terminal 172 via the normally-closed contact of switch 184 and lead 186 while opening the "high-fire" contact of switch 174. The modulator circuit referred to hereinabove consists of an external control circuit providing automatic actuation of modulating equipment for fuel and air flow, well known in the art. Each modulator normally has input terminals corresponding to the terminals illustrated in FIGURE 1a and designated by numerals 182, 183, 172 and 173 herein referred to as "low-fire," "automatic," "common," and "high-fire" terminals.

Terminals 172, 182, 183 and 173 are used only to override the control action of an externally connected modulator control system. The external modulator and its control system serve the purpose of automatically maintaining the proper air to fuel ratio of the burner system when the burner capacity is varied in accordance with load demands. The above-mentioned terminals only serve the purpose of temporarily by-passing the modulator control system during a burner start-up sequence. During this sequence the damper motor controlling the flow of combustion air is forced to the high-fire and low-fire position as described herein. At the end of this sequence terminal 183 of the control allows the modulator to operate on its own automatic control system.

At the moment solenoid winding 146 is energized, it establishes its own holding circuit via diode 188 and the normally-open contact of switch 74 now closed, concurrently interrupting the start-up circuit to solenoid winding 76 by opening the normally-closed contact of switch 74. Winding 76 at present is maintained energized, however, by the signal from timer lead 48.1 via transistor switch 52, lead 120 and normally-closed switch 88, lead 122 and diode 124. Upon the expiration of a second period of 32 seconds, 64 seconds from start-up, output 48.1 will again change from —6 to 0 volts, thus opening transistor switch 52 and de-energizing the detector relay 76, thereby causing the ignition relay armature 132 to be actuated by energizing solenoid winding 142 via the normally-open contact of switch 74, lead 189, normally-closed switch 126 and lead 190. The output 48.2 of timer unit 48 changes from 0 to —6 volts at the instant output 48.1 changes from —6 to 0 volts thus closing transistor switch 49 and allowing current to flow through the normally-open contact of switch 114 now closed and winding 142, thus holding armature 132 in its actuated position. It will be noted that the 64-second pre-purge period has now been completed, burner fan motor 10 being continuously energized via switch 178, the ignition cycle has started by actuating armature 132 which closed the normally-open contact of switch 192 thereby energizing ignition transformer 12 and pilot fuel valve 14, in parallel, via terminal 30 of 110/230 volt supply line, lead 168, switch 166, lead 164, normally-closed switch 212, lead 167, terminal 31, external interlocking controls 33 and 35 in series in lead 37 to terminal 39, lead 195 having external interlocking control 42 in series, terminal 43, lead 196, normally-open switch 192, lead 194 to terminal 45 and thence to lead 47. Interlocking controls 33, 35 and 42 are externally-actuated safety devices such as limit switches, air-flow controls and the like which are adapted to interrupt the control circuit upon existence of undesired external system parameters.

The energization and de-energization of winding 76 has been confirmed since the energization of winding 146 is dependent on winding 76 being energized and the energization of winding 142 and actuation of armature 132 is dependent on winding 76 being de-energized. The opening of pilot fuel valve 14 and energization of ignition transformer 12 ignites the pilot flame causing the flame scanner 125 to switch on the amplifier 54 as described hereinabove, thus energizing detector relay 76 via lead 198, normally-open contact of switch 118 and lead 200 through diode 124.

The output 44.1 of bistable timing unit 44 changes from 0 to —6 volts eight seconds after start-up and remains in that condition for eight seconds reverting to its 0 volt state at the expiration of 16 seconds from start-up, this cycle being repeated continuously and thus, every eight seconds transistor switch 50 receives a negative signal via lead 44.1 thus closing transistor switch 50. Eight seconds after the closing of switch 202, transistor switch 50 will be turned on allowing current flow through lead 116, the normally-open contact of switch 202, lead 204, lead 206, normally-open contact of switch 208 and lead 210 to winding 140 actuating armature 130 and closing the normally-open contact of switch 212 communicating with main fuel valve solenoid 16 via lead 214, terminal 49a and lead 51. The common contact of switch 212 is connected to the 115/230 volt terminal 30 via lead 168, normally-closed contact of switch 166, lead 164, normally-open contact of switch 160, lead 162, normally-open contact of switch 178 and lead 180 to terminal 39 and lead 37 having interlocking controls 33 and 35 in series, terminal 31 and lead 167. The actuation of armature 130 closes the normally-open contact of switch 59 and since the normally-open contact of switch 208 is closed, allows current flow via leads 206 and 210 to winding 140 thereby holding armature 130 in its actuated position. It is evident that the operation of the main fuel valve is interlocked by both the positions of the alarm relay armature 138 and the detector relay armature 136, thus providing a safety interlock in the low-voltage control circuit as well as in the line voltage output circuit.

The modulator valve is currently maintained in the "low-fire" position now via common terminal 172, normally-open contact of switch 174, lead 186, normally-open contact of switch 184, lead 218, normally-open contact of switch 220 and, lead 222 to terminal 182. Thirty-two seconds after initiation of the ignition period, or 96 seconds after start-up, output 48.2 changes from —6 to 0 volts thus opening switch 49 and de-energizing winding 142, thereby opening switch 192 and disconnecting the ignition transformer 12 and pilot valve 14. The main burner flame is now self-maintaining and continuously supervised by the flame scanner 125. When winding 142 is de-energized and armature 132 returns to its normal at-rest position, the modulator valve is switched to the "automatic" position by the return of switch 220 to its normally-closed position connecting with terminal 183, thereby opening the circuit to "low-fire" terminal 182. At the same instant, outlet 48.2 changes its state, outlet 48.1 changes from 0 to —6 volts, thereby closing switch 52 and transmitting a ground signal to "and" gate 38 via the normally-open contact of switch 88 and lead 92, thereby arresting the clock-pulse generator 40 thus temporarily stopping the electronic timer. The start-up cycle is now completed and, under normal conditions, the burner will continue to operate until the operating control switch 57 is opened. For purposes of illustration, the relative periods of energization of solenoids 76, 146, 142 and 140 are shown in FIGURE 6.

During shut-down of the system, initiated by opening the contacts of switch 57, the holding circuit of winding 140, previously described, is interrupted and armature 130 returns to its normal position after a slight delay, approximately 150 msec., induced by capacitor 152.

The de-energization of winding 140 and return of armature 130 to its normal at-rest position results in switch 212 opening the circuit to lead 214 and an immediate de-energization of main fuel solenoid 16 and shut-down of the main burner flame. Concurrently therewith a holding circuit is formed for winding 76 via output 48.1, transistor switch 52, lead 120, normally-closed contact of switch 88, lead 122, diode 124 and for winding 146 via aforementioned lead 122, diode 176, normally-open contact of switch 126 and lead 189. Winding 146 was energized during the de-energization and transition of winding 140 by a signal from amplifier switch 54 via lead 198, normally-open contact of switch 118, lead 200, diode 176 and normally-open contact of switch 126 and lead 189. Because of the opening of switch 88 to lead 92, the ground signal to gate 38 is discontinued thus opening the gate and releasing clock-pulse generator which proceeds to re-initiate the electronic timing sequence. Concurrently, the modulator valve is again switched to the "low-fire" position by the closing of switch 184.

The post-purge period has now started and lasts for 32 seconds until timing output 48.1 changes to its 0 volt state, thus opening switch 52 and de-energizing relay windings 146 and 76 and opening switches 178 and 160 to lead 162 thereby stopping the burner fan motor.

Since the input signal via switch 57 is now removed, the change of state of lead 48.2 from 0 to —6 volts will now switch the input memory bistable 36 back to its initial position via the normally-closed contact of switch 114 and lead 36.2, thus blocking gate 38 by a ground signal from lead 90 stopping the clock pulse generator 40.

The entire control circuit is now in its original state and reset for the next cycle, an entire burner cycle having been completed. It will be noted that should switch 57 close its contacts during the post-purge period, then the automatic reset signal to the input memory unit 36 will not take effect due to normally-closed contact of switch 114 being in an opened position.

Having described the start-up, continuous run, and shut-down of the system of the present invention, the operation of the system resulting from ignition failure, flame failure, momentary power failure, false light or defective scanner circuit and automatic component check will now be described.

In the event the pilot flame should not ignite within eight seconds after initiation of the ignition period, the —6 volt signal emitted by output 44.1 will energize the winding 148 of the mechanically-latching alarm relay armature 138 via transistor switch 50, normally-open contact of switch 202, leads 204 and 206 and normally-closed contact of switch 208 and 209.

Once armature 138 is in its locked position, normally-closed contact of switch 58 opens thus interrupting the operating circuit via lead 34.6, switch 57 and lead 34.4 to the signal conditioner 34 and closing the circuit to lead 94 and gate 38 thereby grounding diode 38.3 of gate 38 and blocking said gate thereby stopping the pulse generator instantly and arresting the program. The actuation of armature 138 also opens normally-closed contact of switch 166 thereby immediately interrupting the supply circuit via lead 168 to all burner and control equipment thus shutting down the entire installation. Since switch 166 now closes circuitry having lead 168 from the 115/230 volt supply, lead 226 and terminal 227 to parallel leads 228 and 230 having alarm horn 18 and alarm light 20 respectively in series to neutral 22, the necessary alarm signals are given. As soon as winding 148 becomes energized, it mechanically locks in that position requiring manual resetting.

Upon the manual reset of armature 138, an automatic reset pulse from signal conditioner 34 will reset the entire control sequence into the start-up position and automatically, substantially instantaneously recycle the entire burner sequence, provided switch 57 remains closed thereby demanding burner supervision.

In the event that the main burner flame should become extinguished after the start-up cycle has been completed, i.e. the ignition and pilot valve de-energized, the scanner 125 would cease conducting current instantaneously thereby opening amplifier switch 54 and de-energizing the detector relay winding 76. The holding circuit to winding 140 is now also interrupted by the closed contact of switch 208 opening due to the return of armature 136 to its normally at-rest position. The de-energization of winding 140 is slightly delayed, 150 milli-seconds, by capacitor 152, thereby temporarily maintaining the circuit through normally-open switch 59 to provide a circuit to winding 148 via the normally-closed contact of switch 208. This causes the alarm relay armature 138 to be actuated and lock itself in the alarm position thereby shutting down the installation as described hereinabove.

In the event of momentary power failure, the reset circuitry of the signal conditioner 34 automatically resets the control sequence to its start-up position at the restoration of power and commences recycling the burner system.

Turning now to the problem of false light emission, i.e. light other than that produced by either the pilot flame or main flame during stand-by, it will be evident that if light should impinge on the scanner 125 of sufficient intensity to cause scanner 125 to allow the flow of current therethrough, a scanner signal would instantaneously complete the circuit to the alarm relay coil 148 via amplifier switch 54, as described in detail hereinafter, lead 198, normally-closed contact of switch 128, normally-closed contact of switch 202, and leads 204 and 206 through normally-closed contact of switch 208, thereby actuating armature 138 into its locked position and thus preventing the system from a start-up and providing an alarm signal via the closing of normally-open contact of switch 166. In like manner, a shorted scanner cell 125 or related circuit would produce the same condition as described above. An open scanner cell or related circuit results in the same condition as described hereinabove under ignition and flame failure.

It will be apparent from the above discussion that every component is automatically, progressively checked throughout the entire cycle since the operation of the system depends on the progressive interlock of all functional components. Accordingly, all units progressively verify their proper operating status during the start-up cycle and any component failure would result in a completely "fail-safe" condition at any instant.

The use of an indicator tube 56 connected, as indicated, to the system to visually indicate the status of the system during its cycle and location of the area of a malfunction in the event of a shut-down facilitates maintenance and service of the control system.

Figure 10B:
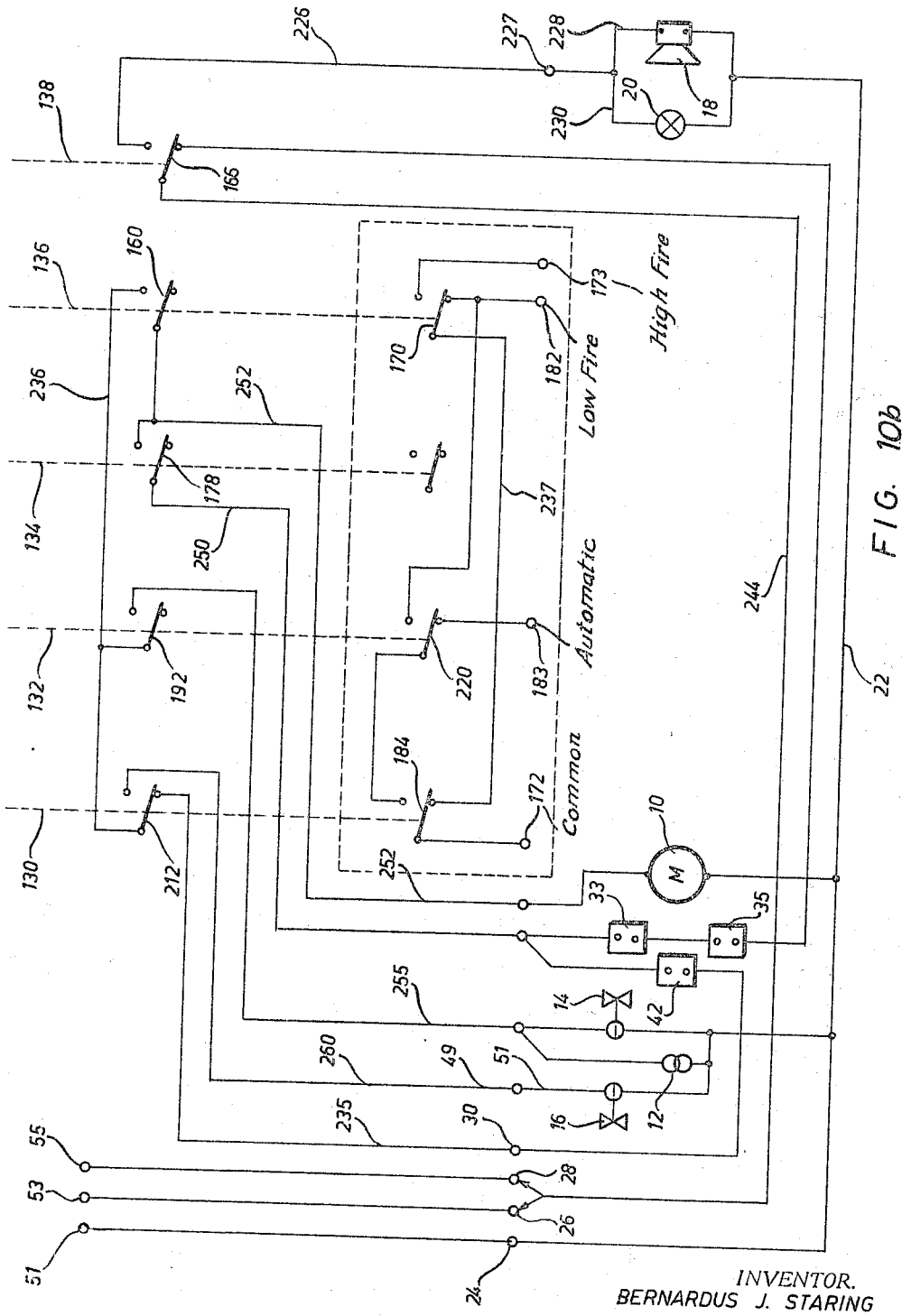

FIGURE 10a illustrates the circuitry of another embodiment of the present invention wherein the solenoid-actuated relay switches each have three sets of single-throw double-pole switches in place of four sets as described hereinabove with reference to FIGURES 1a and 1b. For simplicity of illustration and description, components common to the circuitry of FIGURES 1a, 1b and 10a will be given like reference numerals, it being understood that the circuitry and functions of the power supply unit 32, signal conditioner 34, bistable memory unit 36, gate 38, clock pulse generator 40 and cascading bistable units 41, 44, 46 and 48 shown in FIGURES 1a, 2 through 5 and 7 through 9 remain unchanged. Transistor switches 52 and 54 are connected directly to ground by leads 220, the ground leads shown in FIGURES 7 and 8 respectively. The ground leads of transistor switches 49 and 50 are interconnected by lead 224 and connectable to ground by lead 225 as will become apparent as the description proceeds. Transistor switches 49 and 50 can be switched to ground simultaneously via leads 224 and 225 in series. Transistor switch 50 can be switched to ground via lead 222, the ground circuit to transistor switch 49 being blocked by reverse-biased diode 226.

With particular reference to FIGURE 10a in view of FIGURES 1a and 1b, this latter embodiment of the system will now be described with regard to start-up, operation, shut-down and stand-by.

The closing of switch 57 results in a positive-going starting signal being given to lead 36.1 of the memory unit circuit 36 via leads 34.6 and 228, the normally-closed contact of alarm relay switch 58, lead 34.4 and signal conditioner 34 with output lead 34.9. The starting signal is thus interlocked with the proper starting relay position of switch 58.

The positive starting pulse switches bistable memory unit 36 into its "on" condition, thereby opening "and" gate 38 and releasing the clock pulse generator 40, provided the interlocking gate signals on inputs 92 and 94 of gate 38 are in the proper condition as has been described hereinabove with reference to the circuits of FIGURES 1a and 1b.

The closing of switch 57 also results in flame detector relay 76 becoming energized via leads 34.6 and 228, switch 58, lead 230, normally-closed contact of switch 74 and leads 232, 234, and −6 volt lead 72. The energization of solenoid 76 actuates relay armature 136 closing normally-open contact of switch 160 thereby communicating one side of burner fan motor 10 with the 115/230 volts A.C. supply lead 235 via lead 236 and normally-closed contact of switch 212. This action initiates the pre-purge of the combustion chamber. At the same time, the burner modulating control, if used, is switched to its "high-fire" position via terminal 173; switch 184 being normally-closed to "common" terminal 172 and switch 170 in communication with switch 184 via lead 237 closed by the actuation of armature 136. The action of relay armature 136 is interlocked with the required deenergized position of relay armature 134 by the position of normally-closed switch 74.

At 32 seconds from start-up, input 48.1 of transistor amplifier switch 52 changes from 0 to −6 volts thus switching on transistor amplifier 52 thereby energizing relay coil 146 with armature 134 via lead 238 and lead 72. At the moment solenoid winding 146 is energized, it establishes its own holding circuit via diode 239 and normally-open contacts of switch 74 now closed, concurrently interrupting the start-up circuit to solenoid winding 76 by opening the normally-closed contacts of switch 74.

The closing of normally-open contact of switch 178 by armature 134 connects lead 250 from 115/230 volt A.C. supply terminal 30 to lead 252 thereby providing an alternative circuit for fan motor 10. Concurrent with the closing of switch 178 armature 136 is retracted returning switch 170 to its normally-closed position opening the circuit to "high-fire" terminal 173, closing the modulator circuit from "low-fire" terminal 182 to common terminal 172 via lead 237 and switch 184. The modulator normally has input terminals corresponding to the terminals illustrated in FIGURE 10a designated by numerals 182, 183, 172 and 173 herein referred to as "low-fire," "automatic," "common," and "high-fire" terminals.

Upon the expiration of a second period of 32 seconds, 64 seconds from start-up, input 48.2 of amplifier switch 49 changes from 0 to −6 volts thus energizing transistor amplifier 49 energizing solenoid 142. Armature 132 closes the normally-open contact of switch 192 thereby connecting ignition transformer 12 and pilot flame solenoid valve 14 to 115/230 volts A.C. terminal 30 via lead 255, normally-closed contact of switch 212 and lead 235.

The opening of pilot fuel valve 14 and energization of ignition transformer 12 ignites the pilot flame causing the flame scanner 125 to switch on the amplifier 54 as described hereinabove, thus energizing detector relay 76 via lead 257 having diode 258 in series and lead 234. Eight seconds after start-up and every subsequent eight second interval thereafter, lead 44.1 changes from 0 to −6 volts and thus, eight seconds after ignition transformer becomes energized, input lead 44.1 actuates transistor switch 50 allowing current flow from lead 228 via normally-closed switch 58, lead 230, normally-open contact of switch 74 and lead 225, diode 226 and lead 224 to transistor switch 50; lead 240, normally-open contact of switch 114, leads 241 and 242 to winding 140; thereby actuating armature 130 closing normally-open contact of switch 212 thus communicating main fuel valve solenoid 16 with the 115/230 A.C. terminal 30 via leads 260 and 236. Interlocking controls 33 and 35 are interconnected externally in the manner described hereinabove with reference to FIGURES 1a and 1b. The actuation of armature 130 closes the normally-open contact of switch 59 which allows current flow from leads 242, 222, 224, diode 226, lead 225, normally-open contact of switch 74, lead 230, normally-closed contact of switch 58, lead 228 and normally-open contact of switch 57 to winding 140 thereby holding armature 130 in its actuated position. It is evident that the operation of the main fuel valve is interlocked by the position of the alarm relay armature 138 thus providing a safety interlock in the low-voltage control circuit as well as in the line voltage output circuit.

Thirty-two seconds after initiation of the ignition period, or 96 seconds after start-up, output 48.2 changes from −6 to 0 volts thus opening switch 49 and de-energizing winding 142, thereby opening switch 192 and disconnecting the ignition transformer 12 and pilot valve 14. The main burner flame is now self-maintaining and continuously supervised by the flame scanner 125. When winding 142 is de-energized and armature 132 returns to its normally at-rest position, the modulator valve is switched to the "automatic" position by the return of switch 220 to its normally-closed position connecting with terminal 183, thereby opening the circuit to "low-fire" terminal 182. At the same instant outlet 48.2 changes its state, the output of transistor switch turns negative thus resetting memory 36 which emits a positive-going signal to "and" gate 38 thereby arresting the clock-pulse generator 40 temporarily stopping the electronic timer. The start-up cycle is now completed and, under normal conditions, the burner will continue to operate until the operating control switch 57 is opened.

During shut-down of the system, initiated by opening the contacts of switch 57, the holding circuit of winding 140, previously described, is interrupted and armature 130 returns to its normal position.

The de-energization of winding 140 and return of armature 130 to its normally at-rest position results in switch 212 opening the circuit to lead 260 and an immediate de-energization of main fuel valve solenoid 16 and shut-down of the main burner flame. Input 48.1 is now −6 volts and thus keeps switch 52 conductive maintaining a holding circuit for solenoid 146 for a period of 32 seconds. The de-energization of solenoid 140 results in a negative-going signal via lead 36.1 to reverse the state of memory switch 36 thus opening the "and" gate 38 and releasing clock pulse generator 40 which proceeds to re-initiate the electronic timing sequence. Concurrently, the modulator valve is again switched to the "low-fire" position by the closing of normally-closed switch 184.

The post-purge period has now started and lasts for 32 seconds until timing output 48.1 changes to its 0 volt state, thus opening switch 52 and de-energizing relay windings 146 and opening switch 178 to lead 252 thereby stopping the burner fan motor.

Since the input signal via switch 57 is now removed, the change of state of lead 48.1 from 0 to −6 volts will now switch the input memory bistable 36 back to its initial position via amplifier switch 52, leads 238 and 36.2, thus blocking gate 38 by a ground signal from lead 90 stopping the clock pulse generator 40. The entire control circuit is now in its original state and reset for the next cycle, an entire burner cycle having been completed.

Having described the start-up, continuous run, and shut-down of the system of the present invention, the operation of the system resulting from ignition failure, flame failure, momentary power failure, false light or defective scanner circuit and automatic component check will now be described.

In the event the pilot flame should not ignite within eight seconds after initiation of the ignition period, the −6 volt signal emitted by output 44.1 will energize the winding 148 of the mechanically-latching alarm relay armature 138 via transistor switch 50, normally-open contact of switch 114, lead 252, normally-closed contact of switch 208 and lead 243.

Once armature 138 is in its locked position, the normally-closed contact of switch 58 opens thus interrupting the operating circuit via lead 34.6, switch 57 and lead 34.4 to the signal conditioner 34 and closing the circuit to lead 94 and gate 38 thereby grounding diode 38.3 of gate 38 and blocking said gate thereby stopping the pulse generator instantly and arresting the program. The actuation of armature 138 also opens the normally-closed contact of switch 166 thereby immediately interrupting the supply circuit via lead 244 to all burner and control equipment thus shutting down the entire installation. Since switch 166 now closes circuitry having lead 244 from the 115/230 volt supply, lead 226 and terminal 227 to parallel leads 228 and 230 having alarm horn 18 and alarm light 20 respectively in series to neutral lead 22, the necessary alarm signals are given. As soon as winding 148 becomes energized, it mechanically locks in that position requiring manual resetting.

Upon the manual reset of armature 138, an automatic reset pulse from signal conditioner 34 will reset the entire control sequence into the start-up position at the restoration of power and commences recycling the burner system.

Turning now to the problem of false light emission, i.e. light other than that produced by either the pilot flame or main flame during stand-by, it will be evident that if light should impinge on the scanner 125 of sufficient intensity to cause scanner 125 to allow the flow of current, a scanner signal instantaneously completes the circuit to the scanner relay coil 76 via amplifier switch 54, lead 257, diode 258 and lead 234; thereby energizing solenoid 76 and actuating armature 136 thus closing the normally-open contact of switch 208. Since the signal on lead 44.1 during stand-by is −6 volts, amplifier switch 50 now becomes energized via scanner amplifier 54, lead 257, diode 246, normally-closed switch 59 and lead 222. Amplifier 50 thus energizes solenoid 148 of the alarm relay via lead 240, normally-closed contact of switch 114, lead 262, normally-open contact of switch 208 and lead 243, thereby actuating armature 138 into its locked position, preventing the system from start-up and providing an alarm signal via the closing of normally-open contact of switch 166. In like manner, a shorted scanner cell 125 or related circuit would produce the same condition as described above. An open scanner cell or related circuit results in the same condition as described hereinabove under ignition and flame failure.

It will be apparent from the above discussion that every component is automatically, progressively checked throughout the entire cycle since the operation of the system depends on the progressive interlocking of all functional components. Accordingly, all units progressively verify their proper operating status during the start-up cycle and any component failure results in a completely "fail-safe" condition at any instant.

It will be understood that the above discussion of the operation of the embodiments of the system is illustrative only and that the time sequence can be readily altered and varied by adjusting the frequency of the clock pulse generator which is effected by merely tuning potentiometer 40.8. This, therefore, provides a very flexible timing adjustment for speeding up or slowing down the program according to customer specifications. Also, the pre- and post-purge periods and the ignition and/or pilot-proving time can be conveniently lengthened or shortened by a change of the programmer outputs.

The fuel burner control system of the present invention provides a number of important advantages. The start-up, continuous run, shut-down and stand-by operation of fuel burners are continuously monitored for automatic shut-down in the event of a component or circuitry failure. The control system can be readily modified to suit the customer's requirements regarding the duration of the several steps of operation and is immediately reset to its start position upon a momentary power failure. The system is reliable and substantially trouble-free in operation and utilizes component parts which can be interchanged to simplify maintenance and servicing.

What I claim as new and desire to protect by Letters Patent of the United States is:

1. A system for controlling relay means comprising, in combination: a signal conditioner operative to emit a reset pulse and starting pulse; a clock pulse generator having memory means and gating means responsive to said starting pulse for emitting clock pulses of predetermined frequency; cascaded timing means responsive to said reset pulse and clock pulses for emitting control signals at predetermined time intervals; and switch means for selectively receiving said control signals from said timing means and emitting amplified signals for selectively energizing said relay means.

2. A system for controlling relay means comprising, in combination: a signal conditioner operative to emit a reset pulse and starting pulse; a clock pulse generator for emitting clock pulses of predetermined frequency; memory means and gating means in series with said signal conditioner and clock pulse generator, said memory means responsive to said starting pulse for unlocking said gating means and initiating said clock pulse generator; cascaded bistable means responsive to said reset pulse and clock pulses for emitting control signals at predetermined intervals; and amplifying switch means responsive to said control signals for selectively energizing said relay means.

3. A system for controlling relay means comprising in combination: a signal conditioner operative to emit a positive-going reset pulse and a positive-going starting pulse; a clock pulse generator for emitting clock pulses of predetermined frequencies; memory means and gating means in series with said signal conditioner and clock pulse generator, said memory means responsive to said starting pulse for emitting a negative-going signal and said gating means responsive to said negative-going signal for actuating said clock pulse generator; cascaded bistable means responsive to said positive-going reset pulse and clock pulses for emitting positive-going and negative-going control signals at predetermined time intervals; and switch means for selectively receiving said negative-going control signals from said bistable means for emitting amplified signals for selectively energizing said relay means.

4. In a system as claimed in claim 3, said gating means responsive to ground or positive-going signals for de-actuating said clock pulse generator.

5. In a system as claimed in claim 3, said memory means and cascaded timing or bistable means consisting of flip-flop devices responsive to a positive-going signal for a change of state whereby each of said flip-flop device outputs alternatively emit signals of positive-going and negative-going voltage steps.

6. A fuel burner control system for actuating relay means comprising, in combination, a signal conditioner operative to emit a reset pulse and starting pulse; a clock pulse generator; memory means and gating means in series with said signal conditioner and clock pulse generator, said memory means responsive to said starting pulse for emitting a signal to said gating means operative to actuate said clock pulse generator; cascaded bistable units responsive to said reset pulse and clock pulses for emitting control signals at predetermined time intervals; switch means for selectively receiving said control signals and emitting amplified signals for selectively energizing said relay means; and light responsive means adapted to be illuminated by the flame of the burner for effecting fail-safe conditions.

7. A fuel burner control system for actuating relay means comprising, in combination, a signal conditioner operative to emit a positive-going reset pulse and a positive-going starting pulse; a clock pulse generator for emitting clock pulses of predetermined frequencies; memory means and gating means in series with said signal conditioner and clock pulse generator, said memory means responsive to said starting pulse for emitting a negative-going signal and said gating means responsive to said negative-going signal for actuating said clock pulse generator; cascading bistable means responisve to said positive-going reset pulse and clock pulses for emitting positive-going and negative-going control signals at predetermined timed intervals; switch means for selectively receiving said negative-going control signals from said bistable means for emitting amplified signals for selectively energizing said relay means; and light responsive means adapted to be illuminated by flame of the burner for effecting fail-sale conditions.

8. A fuel burner control system for selectively energizing relay means operatively connected, respectively, to a burner fan motor, modulator, ignition transformer, pilot fuel valve, main fuel valve, alarm horn and alarm light characterized by a signal conditioner operative to emit a reset pulse and starting pulse; a clock pulse generator; memory means and gating means in series with said signal conditioner and clock pulse generator, said memory means responsive to said starting pulse for emitting a signal to said gating means operative to actuate said clock pulse generator; cascaded bistable units responsive to said reset pulse and clock pulses for emitting control signals at predetermined intervals; switch means for selectively receiving said control signals and emitting amplified signals for sequentially energizing said relay means operatively connected to the burner fan motor, modulator, ignition transformer, pilot fuel valve and main fuel valve; and light responsive means adapted to be illuminated by the flame of the burner for effecting fail-safe conditions by de-actuating the relay means operatively connected to said burner fan motor, modulator, ignition transformer, pilot fuel valve, and main fuel valve and actuating the relay means operatively connected to the alarm horn and alarm light.

9. A gating circuit in series with an amplifying switch for detecting a light source of varying or stable intensity comprising first, second and third diodes, first and second voltage sources, means for connecting one side of said diodes with said first voltage source, light sensitive means, means for connecting said light sensitive means in series with said first and second voltage sources, means for connecting the opposite side of said first diode to said second voltage source, a capacitor, means communicating said capacitor with the opposite leads of said first and third diodes, means connecting the opposite lead of said second diode to a voltage suply having a polarity equivalent to said first voltage supply, and means connecting said third diode to an amplifying switch such that the signal response of the circuit is controlled by the input of the second diode.

10. A gating circuit in series with an amplifying switch for detecting a light source of varying intensity during operation or stable intensity during stand-by comprising, first, second and third diodes each having anode and cathode leads, first and second voltage sources, means for connecting said cathode leads with said first voltage source, light sensitive means having a high resistance in the absence of light, means for connecting said light sensitive means in series with said first and second voltage sources, means for connecting said first diode anode lead to said second voltage source, a capacitor having means communicating said capacitor with said first and third diode anode leads, means connecting said second diode anode lead to a third voltage supply having a polarity equivalent to said first voltage supply, and means connecting said third diode anode lead to an amplifying switch whereby a negative potential permits the passage of a steady state signal and the circuit is responsive to a varying signal when the input to the second diode is at ground potential.

References Cited

UNITED STATES PATENTS 2,727,568  12/1955  Smith _____ 158—28

FREDERICK KETTERER, *Primary Examiner.*